US007813524B2

(12) United States Patent
Keller et al.

(10) Patent No.: US 7,813,524 B2
(45) Date of Patent: Oct. 12, 2010

(54) METHOD FOR PROCESSING MAILINGS COMPRISING WRONG RECIPIENT ADDRESSES

(75) Inventors: Stefan Keller, Koenigswinter (DE); Jens Terboven, Bad Honnef (DE)

(73) Assignee: Deutsche Post AG, Bonn (DE)

( * ) Notice: Subject to any disclaimer, the term of this patent is extended or adjusted under 35 U.S.C. 154(b) by 883 days.

(21) Appl. No.: 11/547,432

(22) PCT Filed: Feb. 21, 2005

(86) PCT No.: PCT/EP2005/001779

§ 371 (c)(1),
(2), (4) Date: Sep. 29, 2006

(87) PCT Pub. No.: WO2005/105329

PCT Pub. Date: Nov. 10, 2005

(65) Prior Publication Data

US 2008/0044057 A1 Feb. 21, 2008

(30) Foreign Application Priority Data

Apr. 2, 2004 (DE) ....................... 10 2004 017 042

(51) Int. Cl.
*G06K 9/00* (2006.01)

(52) U.S. Cl. ...................................... 382/101; 209/584

(58) Field of Classification Search ....................... None
See application file for complete search history.

(56) References Cited

U.S. PATENT DOCUMENTS 5,281,487 A 1/1994 Rumaner et al. ............ 428/552
5,703,783 A 12/1997 Allen et al. ............ 364/478.01
5,731,574 A 3/1998 Bodie et al.
5,830,586 A 11/1998 Gray et al. .................. 428/621
5,897,921 A 4/1999 Borom et al. ............... 427/454
5,914,189 A 6/1999 Hasz et al. .................. 428/335
5,989,343 A 11/1999 Borom et al. ............... 118/308

(Continued)

FOREIGN PATENT DOCUMENTS

DE 196 44 163 A1 5/1998

(Continued)

OTHER PUBLICATIONS

International Search Report in PCT/EP2005/001779 dated May 18, 2005.

(Continued)

*Primary Examiner*—Charles Kim
(74) *Attorney, Agent, or Firm*—Marshall, Gerstein & Borun LLP

(57) ABSTRACT

A method for processing mailings comprising wrong recipient addresses, according to which the wrong recipient address is determined from a detected copy of a mailing surface. The inventive method is characterized in that a) a code containing data on instructions given ahead of time is detected on the surface of the mailing, and the instructions that were given ahead of time are determined based on the detected code; b) the wrong address is compared to address data in at least one database selected among a plurality of databases in accordance with the instructions that were given ahead of time; and c) a pieced of forwarding data is applied to the mailings in accordance with the result of the comparison and the instructions given ahead of time.

17 Claims, 4 Drawing Sheets

U.S. PATENT DOCUMENTS

| | | | | |
|---|---|---|---|---|
| 6,022,594 | A | 2/2000 | Borom et al. | 427/453 |
| 6,047,539 | A | 4/2000 | Farmer | 60/775 |
| 6,292,709 | B1 * | 9/2001 | Uhl et al. | 700/226 |
| 6,432,487 | B1 | 8/2002 | Graham et al. | 427/454 |
| 6,706,325 | B2 | 3/2004 | Spitsberg et al. | 427/255.19 |
| 6,740,364 | B2 | 5/2004 | Lau et al. | 427/452 |
| 6,901,151 | B1 | 5/2005 | Rosenbaum et al. | |
| 7,236,970 | B1 * | 6/2007 | Winslow | 707/3 |
| 2001/0010334 | A1 | 8/2001 | Park et al. | |
| 2001/0012378 | A1 * | 8/2001 | Kanevsky et al. | 382/101 |
| 2002/0029202 | A1 | 3/2002 | Lopez | 705/406 |
| 2003/0046103 | A1 * | 3/2003 | Amato et al. | 705/1 |
| 2003/0085162 | A1 * | 5/2003 | Daniels et al. | 209/584 |
| 2003/0089643 | A1 | 5/2003 | Forella et al. | |
| 2003/0114955 | A1 | 6/2003 | Daniels | 700/224 |
| 2005/0004882 | A1 | 1/2005 | Teichgraber et al. | 705/404 |
| 2005/0049890 | A1 * | 3/2005 | Kan | 705/1 |

FOREIGN PATENT DOCUMENTS

| | | | |
|---|---|---|---|
| DE | 198 36 767 | C1 | 11/1999 |
| DE | 101 50 560 | A1 | 4/2003 |
| DE | 101 49 621 | A1 | 7/2003 |
| EP | 0 673 686 | A1 | 9/1995 |
| EP | 0 934 128 | A1 | 8/1999 |
| WO | WO 02/093323 | A2 | 11/2002 |

OTHER PUBLICATIONS

Palmer, "The Bar Code Book: Reading, Printing, and Specification of Bar Code Symbols," Helmers Publishing, Inc, 2nd Ed. (1991).

* cited by examiner

METHOD FOR PROCESSING MAILINGS COMPRISING WRONG RECIPIENT ADDRESSES

BACKGROUND OF THE INVENTION

1. Field of the Invention

The invention relates to a method for processing mailpieces with incorrect recipient addresses, wherein the incorrect recipient address is ascertained on the basis of an acquired image of a surface of a mailpiece.

2. Related Technology

Address errors generally occur when an outdated address or a permanently invalid address has been applied to the mailpieces.

Methods are known that allow a correction of outdated addresses if the addressee has established a forwarding order.

Thus, DE 101 50 560 A1 discloses a method developed by the applicant for processing mailpieces wherein address information of mailpieces is ascertained and compared to a database containing outdated as well as current addresses. The database query then results in an association of the ascertained address information with changed address information that is then applied onto the mailpiece as the new address information.

DE 196 44 163 A1 describes a method for online processing of mailpieces that are to be forwarded. With this method, the name and address of the recipient, the address of the sender, the forwarding labels as well as return notices of a deliverer that are on a mailpiece are read in while the mailpiece is in an intermediate storage area. The information about the recipient is checked in a name-and-address database and, if no match is found, a forwarding file is checked and, if applicable, the mailpieces leaving the intermediate storage area are printed with a changed address and with forwarding directions. Moreover, on each mailpiece that is identified as return mail on the basis of the recognition of pre-instructions or of a delivery notice, the reason for the return, if known, is printed in plain text onto the mailpieces, and for each mailpiece, a database entry with the sender address and the new as well as the outdated recipient address is generated. If the sender so desires, address change reports are sent to him regularly.

Moreover, WO 02/093323 A2 discloses a method in which a notification is sent to a sender of a mailpiece if the recipient address was changed in a forwarding system. In this process, the sender provides the mailpieces with a code that—in addition to information that identifies the sender as well as the recipient—also contains an address to which the notifications about changes to the recipient address are to be sent electronically.

The known methods make it possible to recognize mailpieces that are to be forwarded as a result of a comparison of the recipient address indicated on the mail-piece with addresses present in a forwarding database and to ascertain addresses that have changed. They also make it possible to inform the sender about the address change in an automated manner.

However, forwarding orders do not exist regarding all address changes and furthermore, in addition to an error due to an address change, other address flaws can exist. Thus, the recipient can have moved without a forwarding address or can be deceased, or a company designated as the recipient can have been closed down. Furthermore, the recipient address applied onto the mailpiece can be an address that is permanently invalid.

Processing mailpieces with these additional address flaws is not part of the described methods.

Moreover, the pre-instructions given by the sender pertaining to the fate of incorrectly addressed mailpieces remain largely ignored. If a forwarding order is recognized, it is merely ascertained whether the mailpiece has to be sent back to the sender or forwarded.

GENERAL DESCRIPTION OF THE INVENTION

The invention is thus based on the objective of allowing a fast and reliable processing of mailpieces with address errors, taking into account pre-instructions given by the sender.

In particular, the invention provides that a method used for processing mailpieces that have been provided with an incorrect recipient address, wherein the incorrect recipient address is ascertained on the basis of an acquired image of a surface of the mailpieces, is carried out in such a way that a code that contains information about pre-instructions and that is located on the surface of the mailpiece is acquired and the pre-instructions are ascertained on the basis of the acquired code, the incorrect address is compared to address information contained in at least one database selected from a plurality of databases as a function of the pre-instructions and forwarding information is applied onto the mailpieces as a function of the result of the comparison and as a function of the pre-instructions.

In one embodiment of the method, it is also provided that, as a function of the pre-instructions, a notification is transmitted about the result of the comparison of the incorrect recipient address with the addresses in one or more databases.

Consequently, the present invention creates an advantageous method for expanding known methods for re-addressing or forwarding mailpieces in that pre-instructions given by the sender are comprehensively taken into account in the processing. The comparison according to the invention of incorrect recipient addresses with addresses in one or more databases is adapted dynamically as a function of the pre-instructions so as to ensure the fastest possible execution of the method.

Advantageously, the pre-instructions contain information about the fate desired by the sender for the incorrectly addressed mailpiece as well as information about whether, to what extent and how a notification about the reason for the address error should be transmitted.

The pre-instructions are advantageously applied onto the mailpieces as a code in order to achieve a standardization and to enhance the readability in an automated handling process.

In a another embodiment of the invention, the code containing the pre-instructions is a matrix code that, in addition to the pre-instructions, contains at least information that identifies the sender and possibly also other information.

The possible mailpiece fates include, in addition to delivery on the basis of a corrected recipient address, the return or destruction of incorrectly addressed mail-pieces. Destruction is only an option for advertising as well as newspapers and other press publications that are sent out in large volumes as identical mailpieces and whose sender does not wish for the mailpieces to be returned in case of an address error.

According to the invention, a comparison of the incorrect recipient address with addresses in one or more databases is provided in order to ascertain a reason for the address error and to correct the address.

The scope of the comparison, based on the pre-instructions, is a function of the information about the fate the sender has chosen in case of an address error and the extent to which the sender would like to receive information about the reason for the address error.

In particular, a distinction is made between the following address errors:

- address errors that are due to the fact that the recipient address applied onto the mailpieces is an outdated address that was replaced by a new address because of an address change, or else it is an address with correctable orthographic flaws.
- address errors that arise because the recipient is deceased or the company designated as the recipient has been closed down, and that occur because an address that is permanently invalid was applied onto the mailpiece, or address errors for which no reason can be ascertained.

In order to ascertain an address error, it is especially advantageous to first of all compare the acquired recipient address on the mailpiece with addresses in a data-base containing valid addresses. This comparison is preferably carried out independently of the pre-instructions given by the sender.

On the basis of the comparison of the incorrect recipient address with the address information in the database containing valid addresses, it is also possible to correct address errors that are due to minor orthographic flaws in the address.

After such an error has been corrected, preferably forwarding information in the form of the corrected address is applied onto the mailpiece. If the pre-instructions specify the transmission of a notification about an address change, then a message containing the incorrect and the corrected recipient address is transmitted to an address specified in the pre-instructions. This address is preferably an electronic address such as, for example, an e-mail address.

However, it is likewise possible to provide the notification via another user interface, for example, a web portal.

Mailpieces that have an incorrect recipient address that cannot be corrected by a comparison with the database containing valid addresses undergo further processing on the basis of the method according to the invention after the comparison of the address to the addresses in the database containing valid addresses, whereas mailpieces whose recipient address corresponds to one of the addresses contained in this database enter a normal processing step for delivery.

In yet another embodiment of the method according to the invention, the incorrect recipient addresses, as a function of the pre-instructions, are compared to address information contained in at least one relocation database containing outdated and new addresses of recipients.

The database can contain information pertaining to all address changes in a certain area and can also include the addresses for which no forwarding order exists. However, it is preferable to establish two relocation databases of which one database contains addresses for which a forwarding order exists and the other of which contains information about address changes without forwarding orders.

The comparison of the incorrect recipient address with the addresses in the forwarding database containing addresses with existing forwarding orders is not carried out only if the sender does not desire any notification about the reason for an address error and also has specified that the mailpiece should not be forwarded but rather should be returned or destroyed (in this case, the forwarding is suppressed, in spite of the existence of a forwarding order). Otherwise, this comparison is made, especially in order to carry out a forwarding order of the recipient that might exist.

An additional comparison of the recipient address with the addresses in the relocation database containing address changes without forwarding orders is carried out if the forwarding orders specify a notification about an address change.

In yet another embodiment of the invention, it is likewise possible for the sender to specify that mailpieces be forwarded in case of a known new address of the recipient. In this case, a comparison with this database is likewise carried out.

If the comparison of the incorrect recipient address with the outdated address in one of the relocation databases yields a match, then the new address that goes with the outdated address is ascertained. If a forwarding order of the recipient that has not been suppressed by pre-instructions given by the sender and/or if a forwarding order of the sender exists, then forwarding information is applied onto the mailpiece in the form of the new address and the mailpiece is delivered to this address. If the pre-instructions call for the return or destruction of the mailpiece in case of an address change, then forwarding information in the form of a return address indicated in the pre-instructions or in the form of a destruction notice is applied onto the mailpiece, and the mailpiece is delivered to the return address or destroyed. Here, the return address can be different from the sender address.

Moreover, a notification containing the outdated address and the new address is transmitted to an address specified in the pre-instructions if the pre-instructions specify the transmission of such a notification.

In yet another embodiment of the method according to the invention, the incorrect recipient address is compared to addresses in a database containing addresses of deceased persons and closed-down companies.

This comparison is preferably carried out if the ascertained pre-instructions indicate that, in case of an address error, the sender would also like to be notified about the reason for the error if no address change is present. If the comparison indicates a match of the incorrect recipient address with an address stored in the database containing addresses of deceased persons and closed-down companies, then a notification that the recipient is deceased or that the company designated as the recipient has been closed down is transmitted to an address indicated in the pre-instructions. Moreover, depending on the desired fate of the mailpiece, then forwarding information in the form of a return address indicated in the pre-instructions or in the form of a destruction notice is applied onto the mailpiece.

Another embodiment of the method according to the invention is also characterized in that a comparison of the incorrect recipient address with addresses in a second database is only carried out if the comparison of the recipient address to addresses in a first database if the comparison on the basis of the first database did not yield a match of the recipient address with an address contained in the database. This approach contributes considerably to a fast execution of the method according to the invention since superfluous comparisons are avoided.

The embodiments of the method according to the invention presented above allow a completely automated process sequence in which the presence of an address error is recognized when the recipient address applied onto the mailpieces does not match address information contained in a database containing valid addresses.

Of course, mailpieces for which an address error is ascertained by the deliverer at the delivery location can also undergo processing by means of the method according to the invention.

Here, in yet another preferred embodiment of the method, the image of the mailpiece surface containing the recipient address and the image of the code containing the pre-instructions can be captured by the deliverer employing a scanner and transmitted to a central server. The comparisons of incorrect recipient addresses with the addresses contained in various databases are then, as explained above, carried out in the area of the central server after the addresses have been ascertained from the image.

This achieves the advantage that transportation of the mailpieces to a distribution center during processing is eliminated at first and is only carried out once the fate of the mailpiece and the changed address are known, whereby the central server transmits this address to a computer being operated by the deliverer and this address is then applied by the deliverer onto the mailpieces, for instance, in the form of a label printed with the new address. Mailpieces that are to be destroyed in accordance with the pre-instructions are not transported any further at all.

Thus, the possibility of a transmission of the images of the mailpiece surface and of the code to a central server makes a major contribution to the cost-effectiveness of the method.

If the address error is ascertained by a deliverer at the delivery location, the possibility also exists to generate delivery notices and to likewise transmit these to the central server. These notices can advantageously be taken into account for identifying the database comparisons that have to be carried out and also for ascertaining the order in which the database comparisons are to be carried out. Thus, for example, if due to the existing pre-instructions, an address comparison with a plurality of databases encompassing the database containing addresses of deceased persons and closed-down companies is carried out, the comparison of the incorrect recipient address with the address information in the database containing addresses of deceased persons and closed-down companies is carried out before all other database comparisons if the deliverer indicates in the delivery notice that the recipient is believed to be deceased.

Thus, the invention provides an advantageous method that makes it possible to comprehensively take into consideration pre-instructions given by the sender during the processing of mailpieces and that is characterized by a fast and efficient execution.

BRIEF DESCRIPTION OF THE DRAWINGS

Additional advantages and practical refinements of the invention ensue from the description below of preferred embodiments on the basis of the figures.

The following is shown in the figures.

DETAILED DESCRIPTION

Figure 1:
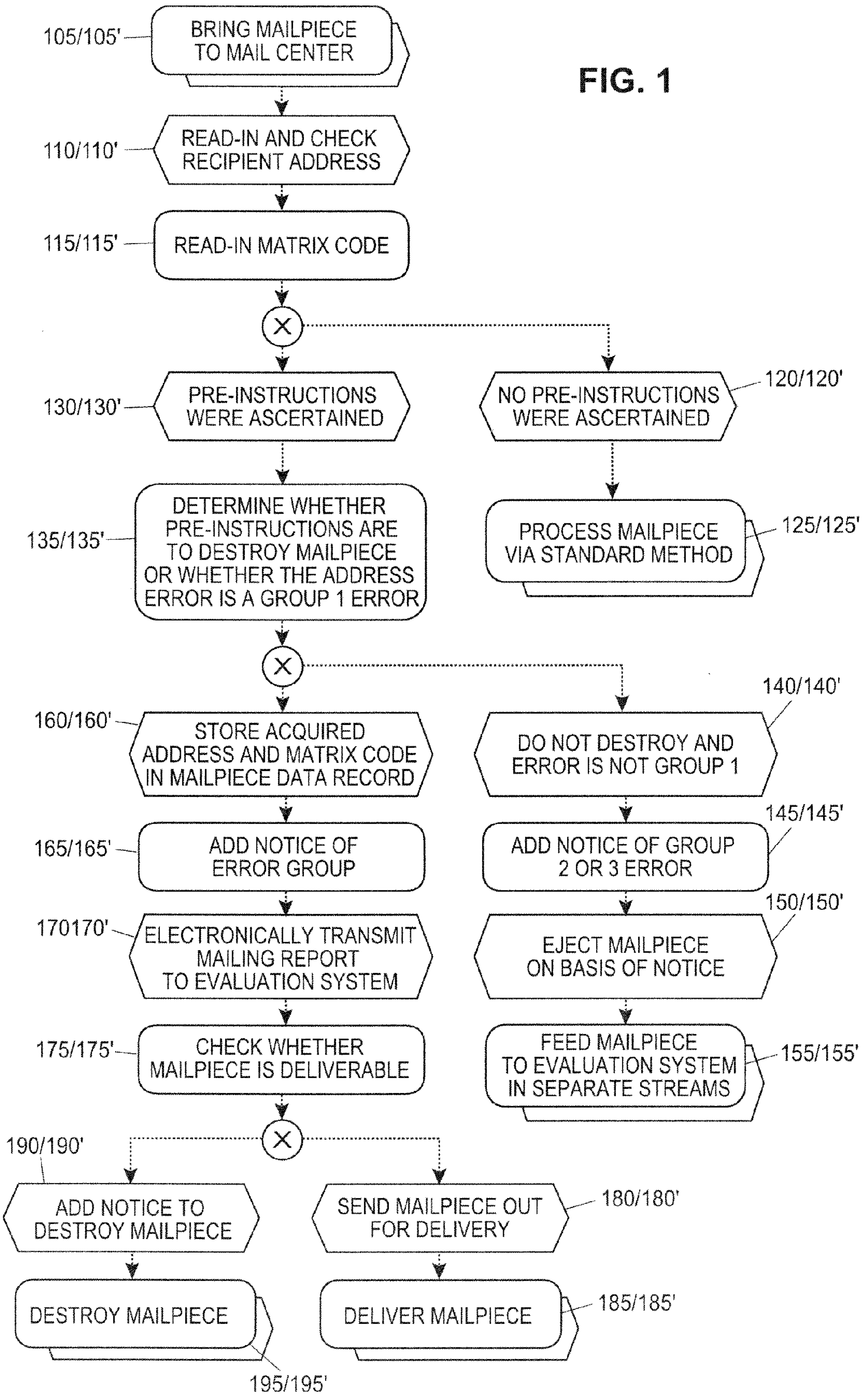
FIG. 1 a diagram with the sequence for the recognition of an address error and the transfer of incorrectly addressed mailpieces to an evaluation system, FIG. 2 a diagram of the sequence for data processing in the evaluation system, FIG. 3 a diagram of the sequence for the identification of relevant address data comparisons and FIG. 4 a diagram of the sequence for the processing of the mailpieces as a function of the fate of the mailpiece as specified by the sender.

The method according to the invention provides that pre-instructions given by the sender are applied onto the mailpieces in the form of a code. Fundamentally, any machine-readable code that can hold a sufficient amount of information is suitable for this purpose, and it is possible that the code contains exclusively information that identifies the sender and that the pre-instructions given by the sender are stored in a database under this identifying information and can be retrieved from there.

However, it is especially advantageous to integrate the information pertaining to pre-instructions into a PC-based method for franking mailpieces.

Such a method developed by the applicant is described, for example, in DE 100 20 566 C2 to which reference is hereby made in conjunction with the method.

The code used for the franking is a matrix code (DMC) containing information about the customer, an identification number for unambiguous identification of a mailpiece, an invoicing number, information about the type of postage and the date of the franking. The matrix code is appropriately encrypted in order to prevent fraudulent use of the franking method.

Within the scope of the present invention, information about pre-instructions given by the sender is incorporated into this matrix code. These pre-instructions include information on the fate desired by the sender for the mailpiece in case an address error occurs as well as information as to whether and to what extent he wishes to receive information about the reason for the address error and/or about an address change.

The customer should preferably subscribe to these services from a postal service provider and should enter into a contract to this effect with the postal service provider. A fraudulent use of pre-instructions by third parties can be ruled out by means of the encrypted matrix code (DMC).

It is provided that the matrix code (DMC) contains at least information about the pre-instructions to which the customer subscribes. However, the method according to the invention also means that a return address that is different from the sender address can be indicated for incorrectly addressed mailpieces and it requires that an address be provided to which the notifications are to be transmitted, if such a transmission is desired. Consequently, in addition to information about different actions that are to be taken, the pre-instructions likewise contain various pieces of customer-specific information and are set forth in a contract between the customer and the postal service provider.

Here, it is practical to divide the entire information about the pre-instructions into a contract component containing the return address and the notification address and into a component containing information to the effect that certain actions are to be taken, the latter part thus indicating the combination selected by the customer among the pre-instructions offered by the postal service provider.

Consequently, the matrix code (DMC) identifies the variant of the pre-instructions and identifies the contract component.

The part of the matrix code (DMC) that identifies the pre-instructions indicates which actions are to be taken by the postal service provider if an address error has occurred. On the one hand, these actions pertain to the fate of incorrectly addressed mailpieces and, on the other hand, to the transmission of notifications.

The possible fates of the mailpieces can be

- delivery of the mailpieces (if the address error is a correctable flaw such as, for instance, a correctable orthographic error in the address),
- forwarding of the mailpieces (if the address error is due to the fact that an outdated address was applied into the mailpiece for which a new address and a forwarding order are present),
- the return (sending back) of the mailpiece (if the incorrect recipient address is neither an address with a correctable flaw nor an outdated address with a forwarding order, or instead of delivery or destruction), the destruction of the mailpieces, although the applicant only offers this for advertising and newspapers and other press publications, not for letters (like-wise if the incorrect recipient address is neither an address with a correctable flaw nor an outdated address with a forwarding order, or instead of delivery or return).

The possible actions that can be taken regarding a notification can be transmission of a notification to the effect that an address flaw is present, transmission of a notification that contains additional information about an address change of the recipient, if this has been ascertained or transmission of a notification that contains additional information about the reason for the address error if no address change is present.

The various degrees within the scope of the notifications stem from the various requirements of the customers of a postal service provider.

The contract component of the matrix code (DMC) indicates the address to which the notifications are to be sent. This address is preferably and electronic address such as, for example, an e-mail address.

Moreover, the contract component contains information about the return address to which returned mail is to be sent. This address is a valid postal address that can differ from the sender address.

Furthermore, the possibility exists that a contract can contain several contract components containing the above-mentioned information; the sender can indicate individually for each mailpiece the desired contract component and thus the return address and the address for the transmission of notifications for each mailpiece.

The possible address errors can be assigned to three different groups in terms of the possible fate of incorrectly addressed mailpieces. The first group (Group 1) comprises address errors that are due to a correctable flaw such as, for instance, an orthographic mistake. The second group (Group 2) comprises address errors that arise because an outdated address was applied onto the mailpiece for which a forwarding order or forwarding directions exist for forwarding the mailpiece to a changed address. The third group (Group 3) contains all of the address errors that are contained neither in Group 1 nor in Group 2 and consequently comprises all of the address errors that prevent a delivery of the mailpieces to a target address ascertained on the basis of the applied recipient address. Such address errors occur when the recipient address is an address that is outdated and that has been replaced by a new address for which no forwarding order exists, when the recipient is deceased or company designated as the recipient has been closed down or when the recipient has moved without a known forwarding address.

Regarding the possible scope of the notification about the reason for an address error or about an address change, Group 3 can be further subdivided into a Group 3a and a Group 3b. Group 3a contains address errors that result from the application of an outdated address for which a changed address can be ascertained, and Group 3b contains address errors resulting from incorrect addresses that cannot be corrected and for which no address change can be ascertained.

Moreover, regarding the possible fates of the mailpieces, a distinction has to be made between different types of mailpieces. The applicant normally distinguishes between regular letters (BS), advertising mailings with sleeves (Wm), advertising mailings without sleeves (Wo), and press publications (PD) comprising newspapers or magazines.

Examples of several variants of combinations of the pre-instructions for the various address errors and types of mailpieces are compiled in the tables below. Here, the tables indicate the fate of the mailpiece and contain a notice as to whether a notification is to be transmitted to the sender. In the case of address errors from Group 1 or Group 2, the notification contains the old address as well as the corrected or changed address of the recipient. In the case of address errors from Group 3—depending on the pre-instructions—notifications with various contents are possible. This will not be presented here, however, since the tables are intended especially to present the possible types of mailpieces. Thus, the transmission of a notification is marked in the table with the addition "+info", irrespective of the content of the notification, and Group 3 is not divided into Groups 3a and 3b.

In Variant 1, the following fates of mailpieces and notifications can be generated by pre-instructions for various types of mailpieces and various address errors:

| | Type of mailpiece Address error | | | |
|---|---|---|---|---|
| | BS | Wm | Wo | PD |
| Group 1 | delivery + info | delivery + info | delivery + info | delivery + info |
| Group 2 | forwarding + info | forwarding + info | forwarding + info | forwarding + info |
| Group 3 | return + info | destruction + info | destruction + info | destruction + info |

A possible Variant 2 differs from Variant 1 in that no notifications are transmitted to the sender. This largely corresponds to the approach when no pre-instructions given by the sender are present, but it entails the possibility of using the pre-instructions to indicate a return address that differs from the sender address. A Variant 3 is preferably only offered for advertising mailings with sleeves (Wm) and corresponds to Variant 1 for letters (BS).

Variant 4 can be used for letters (BS) and for advertising mailings with sleeves (Wm). It is structured as follows:

| | Type of mailpiece Address error | | | |
|---|---|---|---|---|
| | BS | Wm | Wo | PD |
| Group 1 | delivery + info | delivery + info | | |
| Group 2 | return + info | return + info | | |
| Group 3 | return + info | return + info | | |

A possible Variant 5 for advertising mailings with and without sleeves (Wm and Wo) contains the following combinations:

| | Type of mailpiece Address error | | | |
|---|---|---|---|---|
| | BS | Wm | Wo | PD |
| Group 1 | | delivery | delivery | |
| Group 2 | | forwarding | destruction + info | |
| Group 3 | | destruction + info | destruction + info | |

The variants shown are only to be understood by way of example. Fundamentally, any possible combination of pre-instructions can be implemented for any type of mailpiece. However, a combination that is sensible and that complies with the law should be selected.

In addition to the marking of the mailpieces with the matrix code (DMC) containing the pre-instructions, it is likewise advantageous if at least some of the pre-instructions are applied in plain text onto the mailpieces or if the mailpieces are provided with a plain text notice indicating that pre-instructions exist. This notice can, for example, merely contain one single letter—for instance, a capital "P".

Applying the pre-instructions or the notice in plain text allows a deliverer to at least recognize the existence of pre-instructions without auxiliary means.

In order to transport mailpieces from the drop-off location to the delivery location, the applicant—like most postal service providers—first transports the mailpieces from the drop-off location to a mail center where letters intended for a larger region are collected. The mailpieces are sorted in the mail center and transported to local delivery supporting points where they are handed over to a deliverer who then delivers the mailpieces.

Address errors can be recognized by the deliverer during the preparation or during the delivery procedure as well as during the sorting of the mailpieces in a mail center.

FIG. 1 shows the sequence of the recognition of an address error and the transfer of incorrectly addressed mailpieces or of mailing reports to an evaluation system that can process the mailpieces or mail data by means of the method according to the invention.

First of all, the mailpieces are either brought to a mail center or given to a deliverer in a delivery supporting point (105 or 105').

In the mail center, where an automated processing of the mailpieces takes place in a sorting device, in order to recognize address errors, the recipient addresses applied onto the mailpieces can be read in by means of an automated handling process and compared to address information in a database containing all of the valid addresses for the region associated with the mail center.

If the read-in recipient address does not match any of the addresses contained in the database, then an address error is present (110).

The database should likewise contain outdated addresses—appropriately marked—for which a forwarding order exists. Moreover, the sorting device should have a system that is capable of correcting detected incorrect addresses on the basis of the information in the database. Thus, address errors from Groups 1 and 2 can be distinguished in the sorting device and consequently, the errors can be allocated to one of Groups 1 through 3.

After an address error has been recognized and the address errors have been allocated, the matrix code is read in and evaluated, in order to ascertain the existence of pre-instructions (115).

If no pre-instructions have been ascertained (120), the mailpiece is taken away for processing by means of a standard method (125), which is not described in greater depth here.

However, if pre-instructions (130) are present, then first of all, it is ascertained whether the mailpiece in question is one that is to be destroyed or whether an address error of Group 1 is present (135).

If it is not a mailpiece that is to be destroyed and if no address error of Group 1 is present (140), then the mailpiece is provided with a notice to the effect that it is an address error of Group 2 or of Group 3 (145). The mailpieces are then ejected (150) at different places on the basis of their notices and fed to the evaluation system in separate streams (155).

In another embodiment of the invention, it is likewise possible to store the mailpieces under an identification number in an intermediate storage area and to transmit the acquired addresses together with the acquired pre-instructions to the evaluation system so that further transportation of the mailpieces can be eliminated for the time being.

If the mailpiece is one that is to be destroyed or a mailpiece with a correctable address error of Group 1 (160), the acquired addresses and the acquired matrix code (DMC) are stored in a mailpiece data record, and a notice is added to the mailing report indicating the Groups 1 to 3 to which the address error was allocated (165).

The mailing report is electronically transmitted (170) to the evaluation system and advantageously, in addition to the recognized address, it also contains an image of the incorrect recipient address. This can be transmitted later to the sender and makes it easier for the sender to correct the address if the latter could not be completely or at all read in by means of an automated handling process.

Subsequently, it is checked whether the mailpiece is to be destroyed or whether it can be delivered (175) on the basis of the correction of the recipient address, and on the basis of the result, the mailpiece is provided with a notice to the effect that it is to be destroyed (190), or else it is taken away (180) for delivery by means of the standard method on the basis of the corrected address and then delivered (185). The mailpieces that bear a destruction notice are ejected from the processing sequence and destroyed (195).

This recognition is similar to the recognition in a mail center as explained above and is likewise shown with reference to FIG. 1.

The deliverer can, in addition to address errors, also ascertain and indicate other reasons for non-deliverability of mailpieces. Such reasons include that acceptance of the mailpiece was refused or that the mailpiece was not picked up from a post office box.

During the preparation or during the delivery procedure, an address error or undeliverability is recognized by the deliverer (110') in that he notices that the recipient cannot be located at the address indicated or the mailpiece is not accepted or it is not picked up. The deliverer can make a determination as to whether the address error is a flaw in the address, whether the address error is present stemming from an address change with a forwarding order, or whether there are other reasons for the address error. The deliverer identifies an address error because of an address change with a forwarding order on the basis of a comparison of the recipient address with information in a so-called forwarding card containing information about the forwarding order.

Other reasons for undeliverability are, for instance, that the recipient is deceased or that the company designated as the recipient has been closed down or that the recipient has moved and no forwarding order exists for his address. Consequently, these reasons can be allocated to Group 3.

In the next step (115'), the deliverer determines on the basis of the notice in plain text applied onto the mailpieces or on the basis of the pre-instructions applied in plain text whether pre-instructions exist for that mailpiece. If this is not the case (120'), then the mailpiece is taken away (125') for processing by means of a standard method, which is not described in greater depth here.

If the deliverer recognizes the existence of pre-instructions (130'), he decides about the further processing of the mailpiece (135') as a function of the present type of mailpiece and of the present address error.

If the incorrectly addressed mailpiece is neither a mailpiece that is to be destroyed—typically an advertising mailing without a sleeve (Wo) or press publications (PD)—nor a mailpiece that has a correctable address error from Group 1 (140'), then, depending on the type of address error, the mailpiece is prepared (145') for further processing in the evaluation system for carrying out the method according to the invention. Preferably, the mailpieces for which forwarding orders exist are separated from the other mailpieces on which a delivery notice is applied (150') regarding the reason ascertained by the deliverer for the address error or the undeliverability.

Depending on the address error or on the reason for the undeliverability, delivery notices contain the following information:

recipient/company cannot be located at the given address,
acceptance of the mailpiece refused by the recipient,
mailpiece was not picked up,
recipient is believed to be deceased/the company is said to have been closed down.

Here, it is advantageous, but not necessary, to apply the delivery notices in encoded form onto the mailpieces in order to achieve a better machine-readability than in the case of notices in plain text. This, however, calls for an appropriate printer at the delivery supporting points.

Therefore, it is likewise possible for the deliverer to apply a label onto the mailpieces on which he checkmarks the applicable reason for the address error or for the undeliverability.

The mailpieces prepared in this manner are then transported to the evaluation system and fed (155') to it, in turn, in two separate streams.

If the mailpiece is one that is to be destroyed or a mailpiece with a correctable address error (160'), the matrix code (DMC) containing the pre-instructions and an image of the incorrect recipient address is acquired by means of a scanner and, via function keys, delivery notices are entered (165') into a computer indicating the reason for the address error as ascertained by the deliverer.

A data record containing the acquired and entered information is drawn up and transmitted (170') electronically to the evaluation system so that the method according to the invention can be carried out.

In the next step, the deliverer checks the deliverability (175'), delivers the mailpieces that are deliverable on the basis of a corrected address (180' and 185') and destroys the mailpieces that he has identified on the basis of the pre-instructions or of the type of mailpiece as mailpieces that are to be destroyed and whose addresses cannot be corrected (190' and 195').

Figure 2:
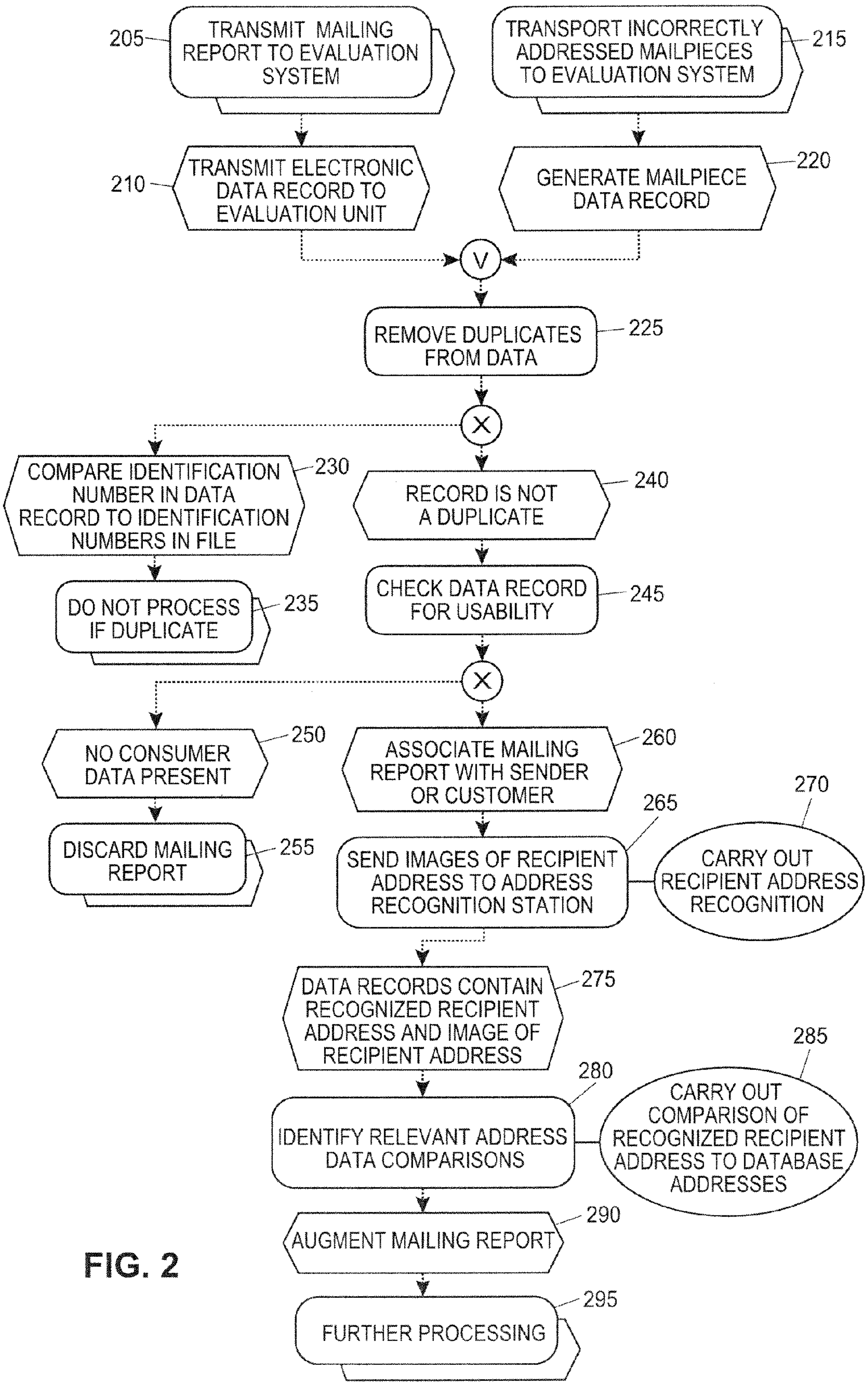

The sequence of the data acquisition and preparation in the area of the evaluation unit is illustrated in FIG. 2.

As described above, the electronic data records of the mailpieces that are delivered in spite of the address error or that are destroyed are transmitted (210) to the evaluation unit. The mailing report contains the matrix code (DMC), the acquired image of the incorrect address and possibly information about the incorrect address itself as well as possibly a delivery notice about the reason for the address error or the reason for the undeliverability. The mailing reports are transmitted (205) to the evaluation system by the sorting device of the mail center or by the deliverer's computer that is located in the delivery supporting point.

Incorrectly addressed undeliverable mailpieces with an uncorrectable address error—including the mailpieces for which a forwarding order exists—are transported (215) to the evaluation unit, whereby mailpieces for which a forwarding order exists are handled separately from the other mailpieces.

In the area of the evaluation unit, first of all, the matrix code (DMC) containing the pre-instructions as well as an image of a part of the mailpiece surface containing the address field are acquired and a mailpiece data record is generated (220) for each mailpiece, said information being stored and filed in the mailpiece data record for purposes of further processing. The mailpiece data record likewise contains a notice as to whether the mailpiece is one for whose recipient address a forwarding order exists, whereby the existence of a forwarding order can be ascertained on the basis of the assignment of the mailpieces to the corresponding mail stream.

During the processing of the mailpiece data record, the mailpieces are stored in an intermediate storage area where they are stored, for example, under the identification number contained in the matrix code (DMC) or under a newly assigned identification number.

The evaluation unit now has a mailpiece data record comprising at least the matrix code (DMC) and an image of the recipient address for all of the mailpieces that are to be processed. The mailpiece data records supplied by the delivery supporting point to the evaluation system or the mailpiece data records for the mailpieces transported from the delivery supporting point to the evaluation unit also contain delivery notices about the reason for the address error or for the undeliverability. In contrast, the mailpiece data records transmitted from the sorting unit to the evaluation system contain, in addition to the image of the recipient address, the recipient address itself that was acquired from the image by means of an OCR and/or video coding device of the sorting unit.

Due to errors in the upstream systems, it can happen that multiple mailpiece data records for one mailpiece are present in the evaluation unit. Thus, for example, duplicates in the data records can arise due to double scanning procedure in a delivery supporting point that escaped detection.

For this reason, a duplicate check is carried out in the area of the evaluation unit in order to remove (225) duplicates from the data. This is preferably carried out on the basis of the matrix code (DMC) contained in the mailpiece data records and especially on the basis of the identification number contained in the matrix code (DMC), which is acquired for this purpose for each mailpiece data record to be processed and subsequently stored in a file.

In order to recognize duplicates, the identification number contained in a mailpiece data record is compared (230) to the identification numbers in the file. If the number is already present in the file, then the mailpiece data record is a duplicate; it is discarded (235) and not processed any further.

If the mailpiece data record to be processed is not a duplicate (240), the data record is checked (245) for usability after the identification number has been stored. In this process, the data belonging to the sender and stored at the time when the contract was concluded is ascertained on the basis of the information in the matrix code (DMC). If no customer data is present (250), the mailing report is likewise discarded (255) and not processed any further. The checking step (245) serves especially to rule out or detect a fraudulent use of the matrix code (DMC) by third parties.

Once the mailing report has unambiguously been associated (260) with a sender or a customer, the images of the recipient address from the mailpiece data records are sent (265) to an address recognition station if this was not already carried out in a preceding processing step. The recognition is preferably carried out (270) by an OCR unit that produces address data records and that can be followed by a manual recognition of the address by processing personnel if the OCR recognition did not yield an unambiguous recognition result.

After these steps, all of the mailpiece data records, in addition to the image of the recipient address, contain the recognized recipient address itself (275).

Depending on the pre-instructions indicated by the matrix code (DMC), the relevant address data comparisons are now identified (280), and the comparison of the acquired recipient address to the addresses in one or more databases (285) is carried out. The detailed sequence of the step (280) is explained below extensively on the basis of FIG. 3.

After the address comparison, depending on the scope of the notification desired by the sender on the basis of the pre-instructions, a changed delivery address and/or the reason for the address error or for the undeliverability are present. The mailing report is augmented by this information (290) and further processed (295).

Figure 3:
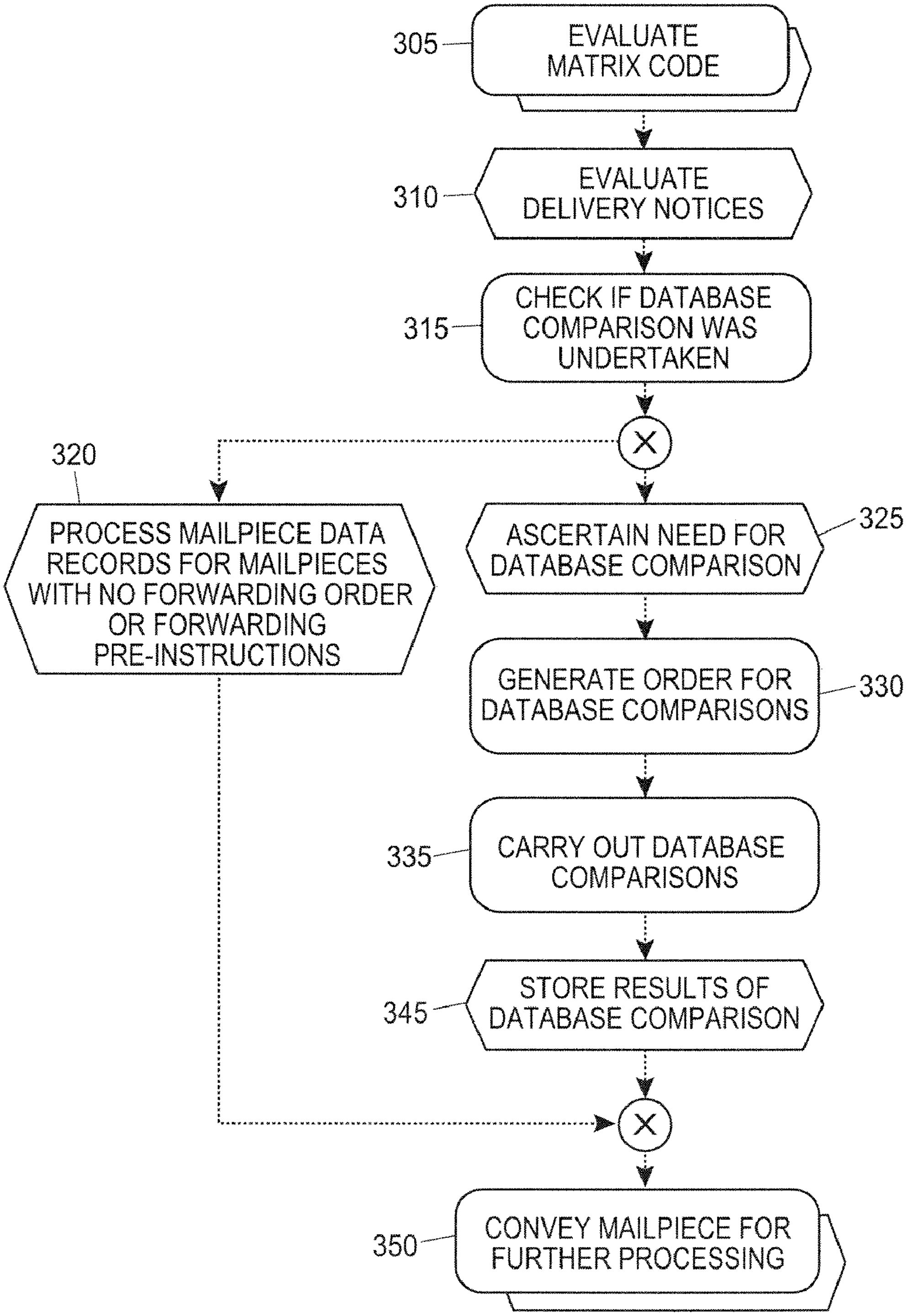

The address comparison to be described on the basis of FIG. 3 is preceded by the evaluation of the matrix code (305) and by the evaluation of the delivery notices (310), to the extent that these are present. In the next step, it is checked (315) whether a database comparison has to be undertaken.

This is not the case for mailpieces for which no forwarding order exists or for which no forwarding is carried out on the basis of pre-instructions to this effect and for which either no notification is to be transmitted or for which the notification is merely to contain the remark that the mailpiece cannot be delivered. The mailpiece data records belonging to these mailpieces are further processed in step 320, in which it is checked whether the mailpieces are to be sent back to an address specified in the pre-instructions or whether they are to be destroyed.

If a return address is recognized, this is marked as the new address in the mailpiece data record and the mailpiece data record is conveyed (350) for purposes of further processing.

If it is ascertained on the basis of the pre-instructions that the mailpiece has to be destroyed, then this is indicated in the mailpiece data record and the mailpiece data record is likewise conveyed for purposes of further processing.

If the need for a database comparison was ascertained (325) in step 315, then an order is generated (330) for the database comparisons that are to be carried out (335). In addition to the extent to which a notification is to be created, the delivery notices are likewise taken into account, if they are contained in the mailing report.

The following databases are available for database searches:

a database (A, LOS database) containing a listing (LOS listing) of all valid postal codes, cities and streets with house numbers, a forwarding database (B) containing outdated and new addresses of recipients whose address has changed, for example, due to a move, and who have given directions that the mail addressed to the old address be forwarded, whereby the forwarding database (B) likewise contains information about whether the recipient has agreed for his address to be disclosed to third parties or not, a relocation database (C) containing outdated and new addresses of recipients whose address has changed, for example, due to a move, and who have not left a forwarding order, whereby the relocation database (C) likewise contains information as to whether the address owner has agreed for his address to be disclosed to third parties or not, a database (D) containing addresses of deceased persons and closed-down companies, a reference database (E) containing a listing of all valid mailing addresses and an undeliverables database (F) containing a list of invalid addresses comprising, for example, outdated addresses of recipients whose new address or whereabouts is not known.

In generating the orders to search in the various databases, in addition to the information as to which databases are to be searched, the sequence in which the databases are to be queried is likewise laid down.

The table below shows pre-instructions and delivery notices as well as the databases to be queried as a function of the pre-instructions and delivery notices in the prescribed sequence. The presence of a forwarding order, which is ascertained on the basis of the assignment of the mailpieces to the corresponding mail stream, is entered in the table as a delivery notice.

Consequently, the following delivery notices were included pertaining to the database comparison:

Za: recipient/company cannot be located at the given address or no delivery notice Zb: acceptance of the mailpiece was refused by the recipient or the mailpiece was not picked up Zc: the recipient is believed to be deceased/the company is said to have been closed down Zd: a forwarding order exists Regarding the database comparisons to be carried out, the table makes a distinction between the following variants of forwarding orders:

Va: forwarding in case of the existence of a forwarding order and either no transmission of a notification or only transmission to the effect that the mailpiece cannot be delivered to the recipient address indicated on the mailpiece.

Vb: forwarding, returning or destroying the mailpiece and transmitting a notification about a changed address of the recipient, but not about the reason for the address error if no address change is present.

Vc: forwarding, returning or destroying the mailpiece and transmitting a notification about an address change of the recipient and about the reason for the address error if no address change is present.

For the various delivery notices and the various pre-instructions, the following database comparisons are carried out:

| Delivery | Pre-instructions | | |
|---|---|---|---|
| notice | Va | Vb | Vc |
| Za | AB[EF] | ABC[EF] | ABCD[EF] |
| Zb | — | — | — |
| Zc | ADB[EF] | ADBC[EF] | ADB[EF] |
| Zd | AB[EF] | ABC[EF] | ABC[EF] |

The comparison of the recipient address with the addresses in the databases is preferably carried out in such a way that no further comparison is made if the comparison in one database has yielded a match.

The comparisons in the databases E and F shown in the square brackets can be undertaken in order to find errors in the preceding processing steps or in the preceding comparisons or else to verify an address error resulting from an unknown reason.

Another checking of the results of preceding method steps that is associated with much less effort is carried out at the beginning of all data comparisons in the form of the comparison of the recipient address with the information in the database A. Address errors that are due to the fact that the postal code, the city, street or house number of the recipient address do not exist or are invalid in their combination can be ascertained in this manner. If such an error is present, the subsequent comparisons with the much more extensive databases do not have to be undertaken.

If the delivery notice Za is present, the databases are selected on the basis of the information to be transmitted to the recipient and the sequence of the comparisons results from the probability of a match in view of the size of the databases.

If the delivery notice Zb is present, no database comparison is carried out since the reason for the undeliverability is clear and no address error is present. An address error would be noted separately by the deliverer.

If the delivery notice Zc is present, the comparison of the recipient address with the addresses in the database containing addresses of deceased persons and closed-down companies even follows the comparison with the database A if the information that the recipient is deceased does not have to be provided to the sender. On the basis of the delivery notice stating that the recipient is deceased the probability is very high that the comparison with the database containing addresses of deceased persons and closed-down companies will yield a match.

Regarding the delivery notice Zd, the sequence results in a similar manner on the basis of the high probability of the presence of a forwarding order in view of the delivery notice.

The results of the undertaken database comparisons are stored (345) in the mailing report, whereby a changed address of the recipient is only entered into the mailpiece data record if the address owner has agreed for his address to be disclosed to third parties. If this authorization has not been given, then the mailpiece data record contains a notice to the effect that the recipient has a changed address but that it may not be disclosed.

The mailpiece data record now contains the complete information for further processing of the mailpiece and for the notification of the customer.

Figure 4:
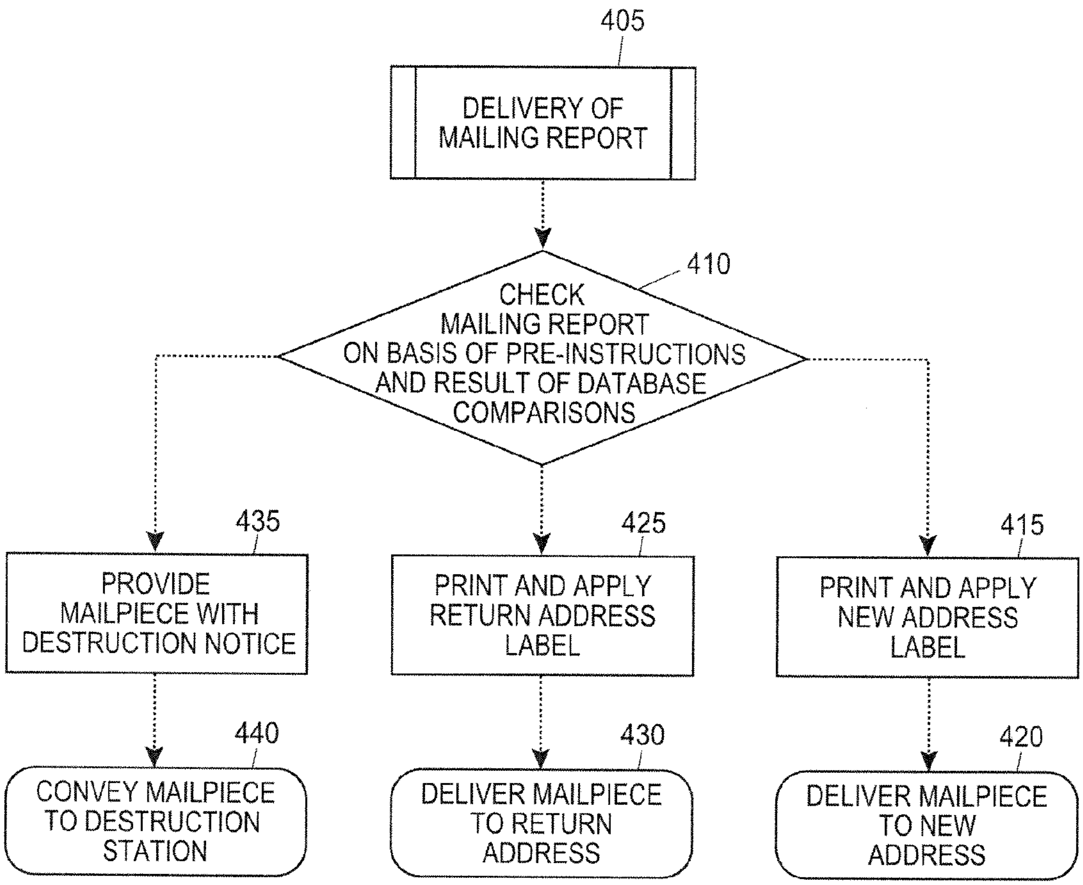

In particular, it comprises forwarding information for the mailpiece relating to a changed delivery address or to a destruction notice. The treatment of the mailpieces corresponding to the forwarding instructions is explained with reference to FIG. 4.

After the delivery (405) of the mailing report, it is checked (410) on the basis of the pre-instructions and of the results of the database comparisons which additional processing steps have to be taken for the mailpiece.

If the mailpiece data record contains a changed address of the recipient as well as a notice of a forwarding order of the recipient and if the sender has agreed in the forwarding order to have the mailpiece forwarded, then an address label with the new address of the recipient is printed and applied (415) onto the mailpiece that was kept in an intermediate storage area during the processing of the mailing report. In order to apply the address label, the mailpiece is taken out of the storage area and after the label has been applied, it is delivered (420) to the address indicated on the label.

If the pre-instructions specify that the incorrectly addressed or undeliverable mailpiece is to be sent back, then the return address, which is likewise contained in the mailing report and which is indicated in the pre-instructions is ascertained. An address label with the return address is printed and applied (425) onto the mailpiece. Subsequently, the mailpiece is delivered to the address indicated on the address label (430).

Even if an address change with a forwarding order from the recipient exists for the recipient address, the mailpiece is always returned whenever the sender has specified that the mailpiece should be sent back.

Moreover, if an address error or a destruction notice is present, the evaluation unit can have incorrectly been given a mailpiece if the applicable pre-instructions were not recognized by the deliverer or within the scope of the sorting procedure in the mail center.

If the presence of a destruction notice is ascertained, the mailpiece is provided (435) with a destruction notice and conveyed (440) to a destruction station. As already explained, however, this is already carried out in the sorting device in the mail center or in the delivery supporting point. Only misdirected mailpieces are destroyed in the area of the evaluation unit.

In order to notify the sender, the mailpiece data record is forwarded to a sending component if the forwarding orders specify a notification of the customer.

The sending component ascertains the address for the transmission of notifications on the basis of the matrix code (DMC) given in the pre-instructions and sends the notifications to this address which can be, for example, an e-mail address.

In addition to the information in the matrix code (DMC) and especially in addition to the identification number of the mailpiece, the notifications contain several or all of the following pieces of information:

the acquired image of the recipient address the recipient address ascertained on the basis of the image the corrected or changed address of the recipient the outdated address of the recipient the reason for the address error or for the undeliverability (if this information is desired)

information about the fate of the mailpiece

The notifications can be transmitted immediately after the processing of the mailpiece data record or else collected for a time interval to be specified by the sender in the pre-instructions, when they are then transmitted.

In another embodiment of the invention, it is provided for the sending component to be replaced by an interface that allows the customer to access the notifications. This interface is preferably an Internet portal that provides the notifications in an appropriately processed form.

Hence, the invention creates an advantageous method that makes it possible to integrate a comprehensive compliance with pre-instructions in automated handling processes, thus ensuring a fast and reliable processing of mailpieces.

If the presence of a destruction notice is ascertained, the mailpiece is provided (435) with a destruction notice and conveyed (440) to a destruction station. As already explained, however, this is already carried out in the sorting device in the mail center or in the delivery supporting point. Only misdirected mailpieces are destroyed in the area of the evaluation unit.

In order to notify the sender, the mailpiece data record is forwarded to a sending component if the forwarding orders specify a notification of the customer.

The sending component ascertains the address for the transmission of notifications on the basis of the matrix code (DMC) given in the pre-instructions and sends the notifications to this address which can be, for example, an e-mail address.

In addition to the information in the matrix code (DMC) and especially in addition to the identification number of the mailpiece, the notifications contain several or all of the following pieces of information:

the acquired image of the recipient address the recipient address ascertained on the basis of the image the corrected or changed address of the recipient the outdated address of the recipient the reason for the address error or for the undeliverability (if this information is desired)

information about the fate of the mailpiece

The notifications can be transmitted immediately after the processing of the mailpiece data record or else collected for a time interval to be specified by the sender in the pre-instructions, when they are then transmitted.

In another embodiment of the invention, it is provided for the sending component to be replaced by an interface that allows the customer to access the notifications. This interface is preferably an Internet portal that provides the notifications in an appropriately processed form.

Hence, the invention creates an advantageous method that makes it possible to integrate a comprehensive compliance with pre-instructions in automated handling processes, thus ensuring a fast and reliable processing of mailpieces.

The invention claimed is:

1. A method for processing mailpieces with incorrect recipient addresses, the method comprising the steps of:

using a mail processing and evaluation system, the mail processing and evaluation system comprising a computer processor, the mail processing and evaluation system performing the following:

ascertaining an incorrect recipient address on the basis of an acquired image of a surface of a mailpiece;

acquiring a code that contains information about pre-instructions, the acquired code being located on the surface of the mailpiece, and ascertaining the pre-instructions based on the acquired code, comparing the incorrect recipient address to address information contained in at least one database selected from a plurality of databases as a function of the pre-instructions; and applying forwarding information onto the mailpieces as a function of the result of the comparison and as a function of the pre-instructions.

2. The method according to claim 1, further comprising, transmitting a notification about the result of the comparison of the incorrect recipient address with the addresses contained in one or more databases.

3. The method according to claim 1, further comprising, applying an address indicated in the pre-instructions as forwarding information onto the mailpieces.

4. The method according to claim 1, further comprising, applying a changed address of the recipient onto the mailpieces.

5. The method according to claim 1, further comprising, applying an address specified in the pre-instructions onto the mailpieces.

6. The method according to claim 1, further comprising, acquiring delivery notices.

7. The method according to claim 1, further comprising, comparing the recipient address to addresses in a database containing valid addresses.

8. The method according to claim 1, further comprising, comparing the recipient address to addresses in a relocation database containing an association between old and new recipient addresses.

9. The method according to claim 1, further comprising, comparing the recipient address to addresses in a database containing addresses of deceased persons and closed-down companies.

10. The method according to claim 1, further comprising, comparing the recipient address to addresses in a second database only if the comparison on the basis of a first database did not yield a match of the recipient address.

11. The method according to claim 1, further comprising, sending a notification about the result of the comparison to an address that is specified in the pre-instructions.

12. The method according to claim 1, wherein, the code containing information about pre-instructions is a matrix code.

13. The method according to claim 1, wherein, the code contains further information comprising at least information that identifies the sender.

14. The method according to claim 6, further comprising, transmitting the acquired code, the image of the mailpiece surface containing the recipient address, and the delivery notices to a central server and comparing the incorrect recipient address to the addresses contained in at least one database in the area of the central server.

15. The method according to claim 6, wherein, the database comparison is additionally carried out as a function of the delivery notices.

16. The method according to claim 10, wherein the address specified in the pre-instructions is an electronic address.

17. The method according to claim 16, wherein the electronic address is an e-mail address.

* * * * *